United States Patent
Mou et al.

(10) Patent No.: US 9,952,963 B2
(45) Date of Patent: Apr. 24, 2018

(54) SYSTEM ON CHIP AND CORRESPONDING MONITORING METHOD

(71) Applicant: HUAWEI TECHNOLOGIES CO., LTD., Shenzhen (CN)

(72) Inventors: Chenglei Mou, Chengdu (CN); Qi Han, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 705 days.

(21) Appl. No.: 14/078,960

(22) Filed: Nov. 13, 2013

(65) Prior Publication Data
US 2014/0143463 A1 May 22, 2014

(30) Foreign Application Priority Data
Nov. 14, 2012 (CN) .......................... 2012 1 0457400

(51) Int. Cl.
*G06F 13/362* (2006.01)
*G06F 11/36* (2006.01)
(Continued)

(52) U.S. Cl.
CPC ........ *G06F 11/364* (2013.01); *G06F 11/3027* (2013.01); *G06F 11/3065* (2013.01);
(Continued)

(58) Field of Classification Search
CPC .... G06F 13/362; G06F 11/348; G06F 11/349; G06F 11/3648; G06F 11/3065; G06F 11/364; G06F 11/3027
See application file for complete search history.

(56) References Cited

U.S. PATENT DOCUMENTS

| 5,454,111 A | 9/1995 | Frame et al. |
| 6,173,339 B1 * | 1/2001 | Yorimitsu ........... G06F 11/0757 710/260 |

(Continued)

FOREIGN PATENT DOCUMENTS

| CN | 1474273 | 2/2004 |
| CN | 101667152 | 3/2010 |
| CN | 101989242 | 3/2011 |

OTHER PUBLICATIONS

Chinese Office Action and Search Report dated Feb. 3, 2016 in corresponding Chinese Patent Application No. 201210457400.6.
(Continued)

*Primary Examiner* — Nimesh G Patel
(74) *Attorney, Agent, or Firm* — Staas & Halsey LLP

(57) ABSTRACT

The present invention relates to aSoC, which includes a master device, a slave device, a high-speed bus, and a monitoring apparatus. The master device is connected to a first port of the high-speed bus, and the slave device is connected to a second port of the high-speed bus, so that the master device is capable of accessing the slave device. The monitoring apparatus is arranged between the first port of the high-speed bus and the master device, and/or between the second port of the high-speed bus and the slave device, and configured to record, based on a high-speed bus communication protocol, state information of each command that passes through the first port and/or the second port, and when state information of a command indicates that an operation of the command is in a timeout state, report an interrupt to locate a faulty node on the high-speed bus.

15 Claims, 12 Drawing Sheets

(51) Int. Cl.
    *G06F 11/34* (2006.01)
    *G06F 11/30* (2006.01)
(52) U.S. Cl.
    CPC .......... *G06F 11/348* (2013.01); *G06F 11/349* (2013.01); *G06F 11/3648* (2013.01); *G06F 2213/0038* (2013.01)

(56) References Cited

U.S. PATENT DOCUMENTS

| | | | |
|---|---|---|---|
| 7,016,996 B1 | 3/2006 | Schober | |
| 2006/0221781 A1* | 10/2006 | Suzuki | G06F 9/3836 369/32.01 |
| 2010/0106886 A1* | 4/2010 | Marcu | G06F 1/3225 711/102 |
| 2010/0332884 A1* | 12/2010 | Yoshida | G06F 1/3203 713/324 |
| 2013/0219452 A1* | 8/2013 | Liu | G06F 21/00 726/1 |
| 2013/0242749 A1* | 9/2013 | Herz | G06F 11/0745 370/241 |

OTHER PUBLICATIONS

Chinese Office Action dated Oct. 17, 2016 in corresponding Chinese Patent Application No. 201210457400.6, 8 pages.

\* cited by examiner

SYSTEM ON CHIP AND CORRESPONDING MONITORING METHOD

CROSS-REFERENCE TO RELATED APPLICATIONS

This application claims priority to Chinese Patent Application No. 201210457400.6, filed on Nov. 14, 2012, which is hereby incorporated by reference in its entirety.

TECHNICAL FIELD

The present invention relates to a chip technology, and in particular, to a system on chip (System on Chip, SoC) and a corresponding monitoring method.

BACKGROUND

With the development of a chip integration trend, more and more chips need to use an internal high-speed bus (bus) to exchange data. With the development of a multi-core trend and increase of functions integrated on a chip, complexity of the internal high-speed bus of the chip is increasingly high. However, a complex bus is faced with an increasingly high probability of problems. How to debug the bus and locate the problems is always a main issue troubling the front-end design of the chip, EDA/FPGA/Emulator verification, and chip software development and debugging.

At present, the high-speed bus protocol in the chip is generally based on multi-channel processing. For example, an AXI (Advanced Extensible Interface) bus of the ARM (Advanced RISC Machines) Holdings company has five channels, namely, a read address channel (AR), a write address channel (AW), a write data channel (W), a read data channel (R), and a write response channel (B).

FIG. 1 is a schematic diagram of a master device (Master) and a slave device (Slave) that are connected by a high-speed bus (BUS) in the prior art. As shown in FIG. 1, a high-speed bus 13 between a master device 11 and a slave device 12 has five channels, namely, a read address channel (Read Address Channel) 14, a read data channel (Read Data Channel) 15, a write address channel (Write Address Channel) 16, a write data channel (Write Data Channel) 17, and a write response channel (Write Resp Channel) 18. The master device 11 is defined as an active initiator of a command and data writing and a receiver of a returned response, while the slave device 12 is defined as a receiver of the command and an initiator of data reading and the response. Generally, a processor is used as the master device 11, and has a master port connected and used with a master port of the high-speed bus 13 to actively read data; and a memory (memory) is used as a slave device 12, and has a slave port connected and used with a slave port of the high-speed bus 13 for the master device 11 to read data and return a response.

FIG. 2 is a time sequence diagram of each channel in a high-speed bus shown in FIG. 1. As shown in FIG. 2, each channel uses a full handshake mechanism, that is, when no ready pulse arrives, a valid pulse is not revoked and a next command cannot be sent.

FIG. 3 is a schematic diagram of an existing system on chip SoC (System on Chip). As shown in FIG. 3, a system on chip 30 includes multiple master devices (master) 31, multiple slave devices (slave) 32, and even multiple high-speed buses (Bus) 33. In FIG. 3, the arrow direction indicating the output direction indicates the command output of a master device 31, and the arrow direction indicating the input direction indicates command receiving of a slave device 32. Each arrow direction corresponds to five channels of a high-speed bus. Because the high-speed bus 33 interconnects all master devices 31 and all slave devices 32, all the master devices 31 can access all the slave devices 32. If any node of the high-speed bus, for example, any master device, slave device, or any one or more channels in ports of the bus, is faulty, the fault spreads to a plurality of nodes. That is to say, as long as an operation passes through the faulty node, the operation cannot be completed. Therefore, as long as a node is faulty, the whole system may be affected, so that the whole system on chip is in a deadlock state.

When the deadlock state occurs, all tasks are stopped. However, as the scale of the system on chip is increasingly large and the bus interconnection is increasingly complex, the above problem is more obvious. In addition, generally the high-speed bus may send multiple uncompleted commands at a time, and support disordered return of commands. This further increases the difficulty in locating the faulty node.

At present, the industry has developed a high-speed bus monitoring technology to solve the above problem. At present, the main principle of a known bus monitoring technology lies in: recording all behaviors of nodes on the high-speed bus, then forming a data stream by packetization and decompression, and sending the data stream to a buffer in the system on chip for storage, or sending the data stream to a storage module outside the chip for storage through a port of the system on chip. The function is generally called a trace (Trace) method in the industry, and is similar to that an oscilloscope performs signal sampling and storage and then recovers the signal for analysis by debugging personnel.

Generally, a large chip company in the industry uses a bus debug system developed by itself, including a tool chain, and so on. However, as products of the ARM Holdings company are widely used, the Coresight debug component and system that are defined by the ARM Holdings company are gradually used by many companies. The ARM Holdings company has developed a debug component for the highest-speed AXI high-speed bus recently.

FIG. 4 is a schematic diagram of a system on chip using a bus debug technology of the ARM Holdings company in the prior art. As shown in FIG. 4, a system on chip 40 includes an ARM processor core (ARM core) 41, a direct memory access module (Direct Memory Access, DMA) 42, a digital signal processor core (DSP core) 43, a double data rate synchronous dynamic random access memory controller (DDR SDRAM controller) 44, an internal static random access memory (Internal SRAM) 45, and other peripherals (Other Peripheral) 46.

The ARM processor core 41, memory content direct removing module 42, and digital signal processor core 43 are used as master devices (Master), while the double data rate synchronous dynamic random access memory controller 44, internal static random access memory 45, and other peripherals 46 are used as slave devices (slave). The master devices and slave devices are connected through an AXI high-speed bus 47. In addition, a bus trace (BusTrace) apparatus 48 may be arranged at ports connecting the AXI high-speed bus 47 and the master devices and slave devices, so as to record each command passing through the ports. The bus trace apparatus 48 may be arranged at some ports of the AXI high-speed bus 47 as required to connect to the master devices or slave devices. Herein the bus trace apparatus 48 is arranged at ports of the AXI high-speed bus 47 connecting the ARM processor core 41, memory content direct removing module 42, digital signal processor core 43, double data rate synchronous dynamic random access memory controller 44, and internal static random access memory 45.

When the system on chip works, the bus trace apparatus 48 is used as a debug component, which records events such as command sending and response returning of a port corresponding to the AXI high-speed bus 47, forms a frame in a format by using an event content, and incorporates a unique ID assigned by each bus trace apparatus 48 as an identifier into the frame. Then, the recorded content is output through a debug bus 49. The debug bus 49 may be an ATB debug bus defined by the ARM Holdings company, and is independent of the AXI high-speed bus 47. Then, through the ATB debug bus 49, relevant information of each port of the AXI high-speed bus 47 is finally stored in a buffer (buffer) in the system on chip 40, or stored in a DDR memory outside the chip, or output to the outside of the chip through a high-speed port (High Speed I/O).

Test personnel may read the buffer in the system on chip or the DDR memory outside the chip through the tool chain provided by ARM, so as to read the stored content, and by parsing an ID and a frame format of each bus trace apparatus 48, recover the relevant information of a corresponding port of the AXI high-speed bus 47, which is recorded by a corresponding bus trace apparatus 48 within a period.

The above bus debug technology of the ARM Holdings company does not support real-time locating of problems in principle, but belongs to an after-event passive system. After other problems occur in the running of the system on chip, test personnel may query a history record exported by the bus trace apparatus 48, and perform after-event analysis to locate the problems, where the workload of and requirement for analyzing and locating are higher.

In addition, because there is limited storage space corresponding to the bus trace apparatus 48, use of the above debug technology generally requires that one or more trigger conditions of an adjacent time point of a problem should be found, so as to trigger the starting or stopping of trace, or that a filter condition should be found, so that the bus trace apparatus 48 records only behaviors of the bus in the case that a special condition is satisfied. However, searching of the trigger condition or filter condition needs to be analyzed manually and set; and if the setting is incorrect, behaviors of the adjacent time point of the problem may be not recorded; as a result, a problem scenario needs to reoccur repeatedly. Therefore, the debug efficiency is lower.

An existing trace-based bus monitoring technology does not support anomaly recovery in principle, and only records a problem which occurs, and then subsequently provides the record for the test personnel to perform after-event analysis.

In addition, the above bus debug technology exports and stores the behavior events in real time. Because an operation of the bus is generally fast, there are many events within a period. To record enough information within a period and ensure that the information is not lost, the bus debug technology has a certain requirement and cost for the storage space and bus performance.

If the event content is stored in the system on chip, the buffer of the system on chip requires enough space and its power consumption cost is correspondingly increased.

If the event content is stored in the DDR memory outside the chip, the event content needs to occupy port traffic of the DDR memory. However, when bus events frequently occur, generally the bus frequently accesses the DDR memory, which may generally require the bandwidth of the DDR memory to synchronously increase and change, and therefore, has a great impact on the system performance.

If the event content is exported to the outside of the chip through a high-speed port, a high requirement is imposed on a PAD type selection and printed circuit board PCB design, and hardware outside the chip needs to be purchased from the ARM Holdings company. Therefore, the cost is high.

In addition, the bus debug technology of the ARM Holdings company needs to be supported by the tool chain of the ARM Holdings company, cannot support self-locating of new trace contents, and is inflexible.

At present, a bus debug technology developed by the TI (Texas Instruments, Texas instruments) Incorporated company is also popular in the industry, and the bus trace technology is basically similar to that of the ARM Holdings company, with the only difference in that: In the bus debug technology of the TI company, an input event may come from a VBUSM high-speed bus of the TI Incorporated company instead of the AXI high-speed bus of the ARM Holdings company, and a bus for exporting the record content of the bus trace apparatus to the buffer is a VBUSP test bus of the TI Incorporated company instead of the ATB test bus of the ARM Holdings company. In addition, the bus debug technology of the TI Incorporated company supports only importing the content output by the bus trace apparatus to the buffer in the system on chip, but does not support importing the content output by the bus trace apparatus to the DDR memory outside the chip or using a high-speed port to export the content to the outside of the chip.

The bus debug technology of the TI Incorporated company has the same disadvantages as the bus debug technology of the ARM Holdings company, and because it does not support importing the content output by the bus trace apparatus to the DDR memory outside the chip or using the high-speed port to export the content to the outside of the chip, the bus debug technology of the TI Incorporated company has a greater impact on the cost of the power consumption on chip than the bus debug technology of the ARM Holdings company.

Therefore, how to quickly locate and restore the faulty node of the high-speed bus is one of urgent problems to be solved.

SUMMARY

Therefore, the present invention provides a system on chip and a corresponding monitoring method, so as to actively report and quickly locate an abnormal node and reset the abnormal node when an abnormality occurs.

Specifically, an embodiment of the present invention provides a system on chip, which includes a master device, a slave device, a high-speed bus, and a monitoring apparatus. The master device is connected to a first port of the high-speed bus, and the slave device is connected to a second port of the high-speed bus, so that the master device is capable of accessing the slave device. The monitoring apparatus is arranged between the first port of the high-speed bus and the master device, and/or between the second port of the high-speed bus and the slave device, and configured to record, based on a high-speed bus communication protocol, state information of each command that passes through the first port and/or the second port, and when state information of a command indicates that an operation of the command is in a timeout state, report an interrupt to locate a faulty node on the high-speed bus.

An embodiment of the present invention further provides a monitoring method applied in a system on chip. The system on chip includes a master device, a slave device, a high-speed bus, and a monitoring apparatus. The master device is connected to a first port of the high-speed bus, and the slave device is connected to a second port of the high-speed bus, so that the master device is capable of accessing the slave device. The monitoring apparatus is arranged between the first port of the high-speed bus and the master device, and/or between the second port of the high-speed bus and the slave device. The monitoring method includes: recording, by the monitoring apparatus, based on a high-speed bus communication protocol, state information of each command that passes through the first port and/or the second port; and when state information of a command indicates that an operation of the command is in a timeout state, reporting, by the monitoring apparatus, an interrupt to locate a faulty node on the high-speed bus.

The embodiments of the present invention may reach the following beneficial effects: The monitoring apparatus arranged on the port of the high-speed bus records the state of each command and reports an interrupt when the command times out, so that the faulty node can be quickly located in a complex bus-interconnected system; by analyzing the state of each command that is provided by the monitoring apparatus, a cause of the problem is found out: whether the problem is caused by an abnormality of the initiator or receiver of the command; and a phase in which the problem occurs is determined according to the state of the command. In the present invention, an abnormality is reported actively, but in the prior art, an abnormal node is determined by passive parsing and analysis in a later phase. Therefore, the present invention improves the locating efficiency greatly without scenario recurrence and without exporting all data for analysis, thereby reducing the workload significantly.

The above description is only a brief description of the technical solutions of the present invention. To help understand the technical means of the present invention more clearly and implement the technical means according to the content of the specification, and to make the above and other objectives, features, and advantages of the present invention more comprehensible, the following describes the present invention with reference to accompanying drawings and exemplary embodiments in detail.

DESCRIPTION OF EMBODIMENTS

To further describe the technical means and efficacy that are used by the present invention to reach predetermined objectives of the present invention, the following describes specific implementation manners, methods, steps, and efficacy of a system on chip provided by the present invention in detail with reference to the accompanying drawings and exemplary embodiments.

The foregoing and other technical contents, features, and efficacy of the present invention may be presented clearly in the detailed description of the exemplary embodiments in combination with the drawings. Based on the description of the specific embodiments, the technical means and efficacy that are used by the present invention to reach the predetermined objectives may be understood more deeply and thoroughly. However, the accompanying drawings are provided for reference only, and not intended to limit the present invention.

Figure 1:
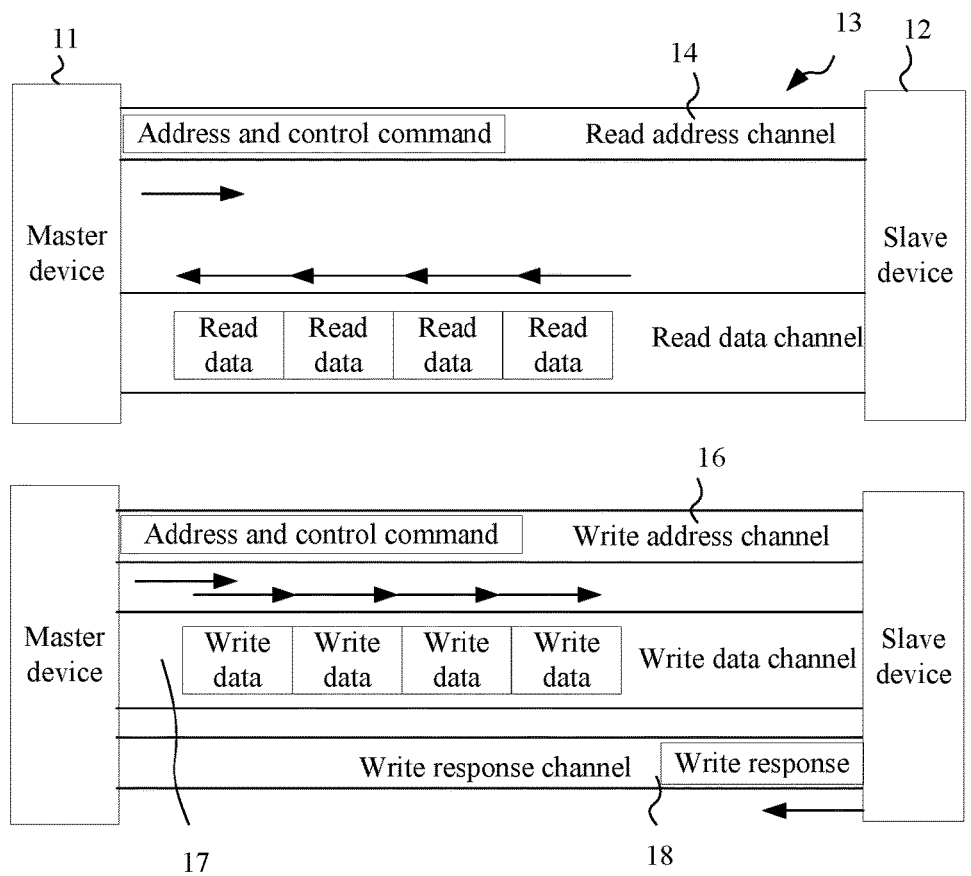
FIG. 1 is a schematic diagram of a master device and a slave device that are connected by a high-speed bus in the prior art.
Figure 2:
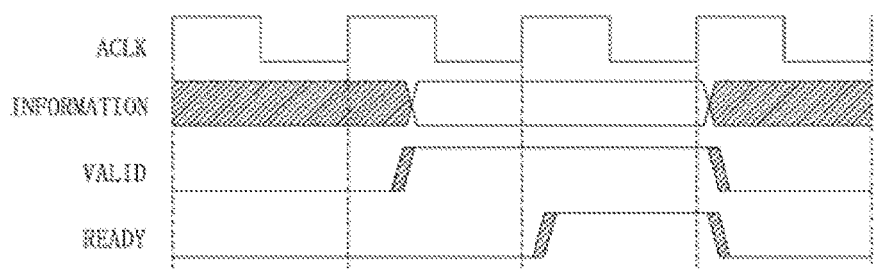
FIG. 2 is a time sequence diagram of each channel in a high-speed bus shown in FIG. 1.
Figure 3:
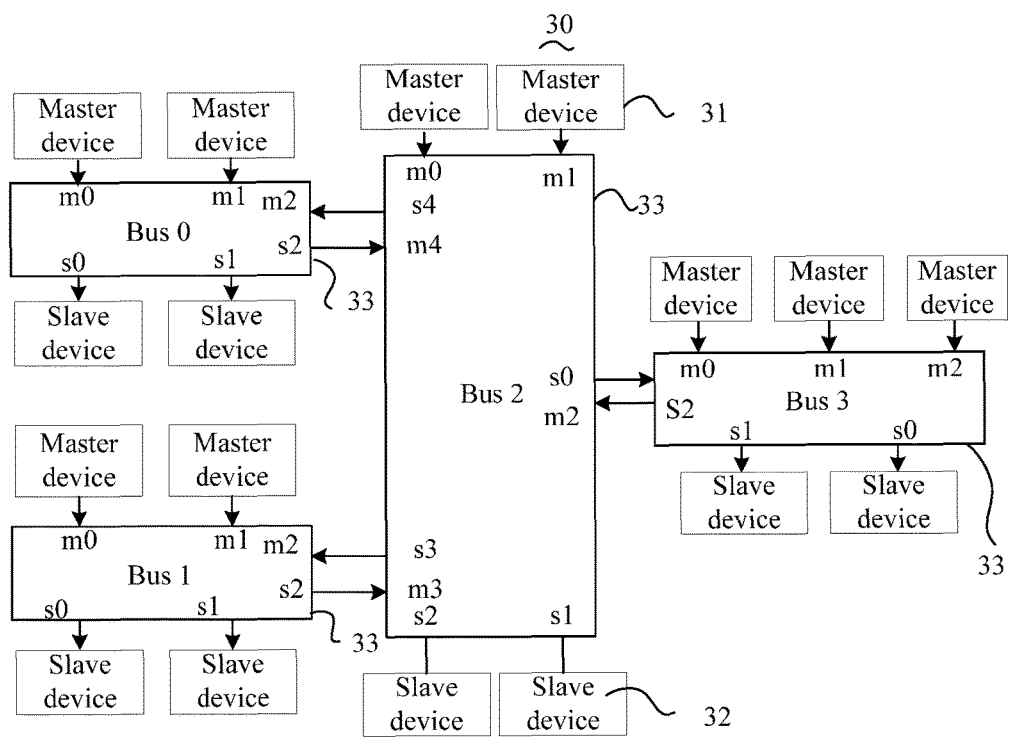
FIG. 3 is a schematic diagram of an existing system on chip SoC (System on Chip)
Figure 4:
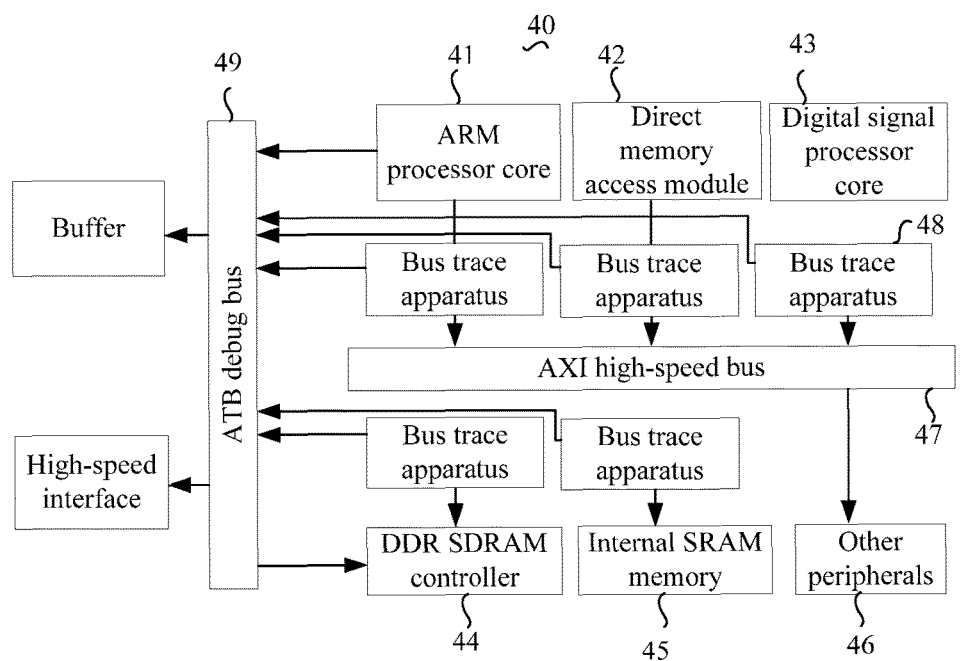
FIG. 4 is a schematic diagram of a system on chip using a bus debug technology of the ARM Holdings company in the prior art.
Figure 5:
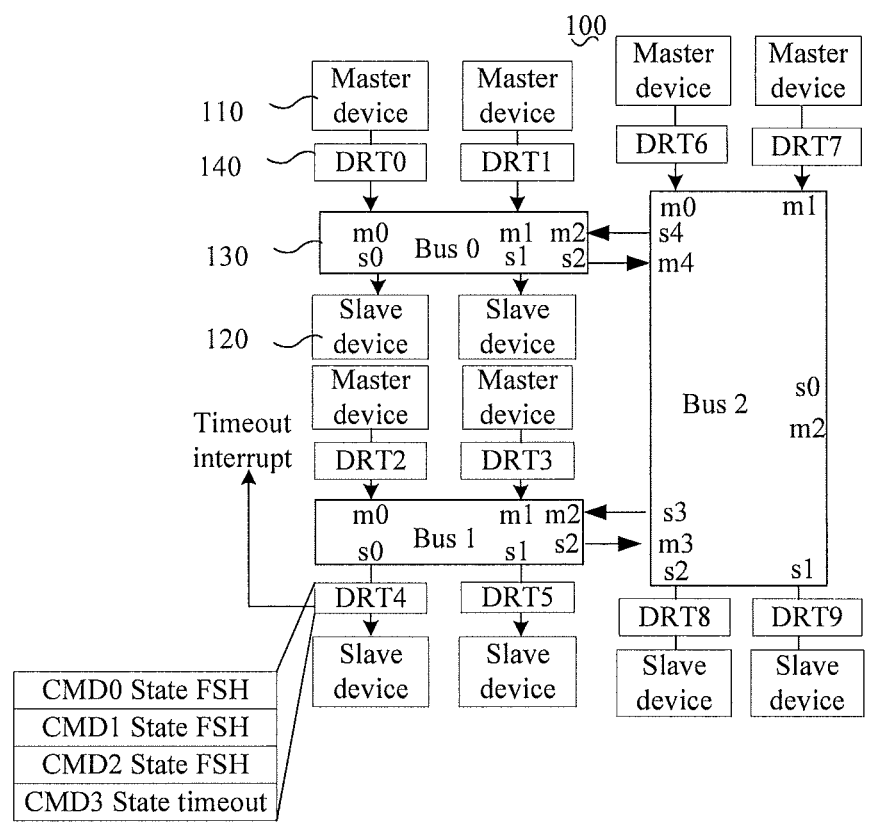
FIG. 5 is a schematic diagram of a system on chip according to an embodiment of the present invention.

FIG. 5 is a schematic diagram of a system on chip according to an embodiment of the present invention. As shown in FIG. 5, a system on chip 100 of the present invention includes a master device 110, a slave device 120, a high-speed bus 130, and a monitoring apparatus 140. The master device 110 is connected to a first port of the high-speed bus 130, where the first port is a port for the master device 110 to access the high-speed bus 130, and the slave device 120 is connected to a second port of the high-speed bus 130, where the second port is a port for the slave device 120 to access the high-speed bus 130, so that the master device 110 is capable of accessing the slave device 120. In this embodiment, the present invention is described specifically by using an example in which three high-speed buses (BUS0, BUS1, and BUS2) are interconnected. It should be noted that, a person skilled in the art should know that when a chip uses an internal high-speed bus to exchange data, the chip generally includes at least one master device 110, at least one slave device 120, at least one high-speed bus 130, and at least one monitoring apparatus 140. Therefore, FIG. 5 is used as a specific embodiment and not used for limiting the present invention. In FIG. 5, each high-speed bus 130 connects two master devices 110 and two slave devices 120. The master device 110 is connected to the first port of the high-speed bus 130 (for example, port m0 or m1 of each bus 130), and the slave device 120 is connected to the second port of the high-speed bus 130 (for example port s0 or s1 of each bus 130). In addition, the high-speed buses 130 are interconnected through other first ports and second ports to perform data transmission between different high-speed buses 130, for example, a first port m2 of the high-speed bus BUS0 is connected to a second port s4 of the high-speed bus BUS2, so that data of the BUS2 is transmitted to the BUS0, where the BUS2 may be regarded as a master device of the BUS0; and a second port s2 of the high-speed bus BUS0 is connected to a first port m4 of the high-speed bus BUS2, so that the high-speed bus BUS0 and the high-speed bus BUS2 are interconnected. Similarly, the high-speed bus BUS1 and the high-speed bus BUS2 are also connected in the same way, so that the three high-speed buses 130 are interconnected. Therefore, any master device 110 can access any slave device 120 through the three interconnected high-speed buses 130.

The monitoring apparatus 140 is arranged at the first port and/or second port of the high-speed bus 130 to record state information of each command that passes through the first port and/or second port, and when state information of a command indicates that an operation of the command is in a timeout state, report an interrupt to quickly locate a faulty node on the high-speed bus 130. A person skilled in the art should know that, the node herein is the master device 110 or slave device 120 that is connected to the high-speed bus 130, and that according to information of the faulty node, a specific faulty master device 110 or slave device 120 may be located. In addition, after the monitoring apparatus 140 reports an interrupt to quickly locate the faulty node on the high-speed bus 130, the monitoring apparatus 140 at the node may replace the corresponding master device 110 or slave device 120 to complete, in a virtual manner, the command in the timeout state, and perform a reset operation on the corresponding master device 110 or slave device 120. That is to say, in the present invention, the monitoring apparatus 140 may monitor whether an abnormality occurs, trace the place of the abnormality, and perform a reset operation.

In the present invention, a monitoring apparatus 140 may be arranged at each port of each high-speed bus 130 to respectively record state information of each command that passes through each port. Of course, the monitoring apparatus 140 may also be arranged at some ports of the high-speed bus 130 according to an actual requirement. A person skilled in the art may understand that, because an abnormality generally occurs on the master device 110 and the slave device 120 and generally no abnormality occurs on each high-speed bus 130, the monitoring apparatus 140 may be arranged only at a port of the high-speed bus 130 that is connected to the master device 110 or slave device 120. In the embodiment of the present invention, a monitoring apparatus 140 is respectively arranged at two first ports m0 and m1 of the high-speed bus BUS0 that are connected to the master devices; a monitoring apparatus 140 is respectively arranged at two first ports m0 and m1 of the high-speed bus BUS1 that are connected to the master devices and at two second ports s0 and s1 that are connected to the slave devices; and a monitoring apparatus 140 is respectively arranged at two first ports m0 and m1 of the high-speed bus BUS2 that are connected to the master devices and at two second ports s0 and s1 that are connected to the slave devices, so that the state of each command sent or received by the corresponding master devices 110 and slave devices is recorded respectively.

Based on a high-speed bus communication protocol, the high-speed bus 130 basically supports separation of commands and data. Therefore, before data transmission (that is, a read or write operation) is completed, a command may be sent beforehand. However, based on realizability of a system, the number of commands that each port of the high-speed bus 130 can send beforehand is limited to some extent, where the limitation may be generally called a maximum number of uncompleted (outstanding) commands. For example, if the maximum number of uncompleted commands is 4, it indicates that sending of four commands is supported in the case that a read/write operation is uncompleted, while a fifth command can be sent only after a data read/write operation corresponding to a first command is completed.

Based on the limitation on a maximum number of uncompleted commands that is supported by each port of the high-speed bus 130, in a corresponding monitoring apparatus 140, the number of buffers that matches the maximum number of uncompleted commands need to be arranged to record state information of a commands in the number of uncompleted commands, where the state information includes information such as the state, an address Addr, and an identity number ID of each command. If the commands are completed normally and new commands arrive subsequently, the buffers in the monitoring apparatus 140 may be overwritten in sequence.

Figure 6:
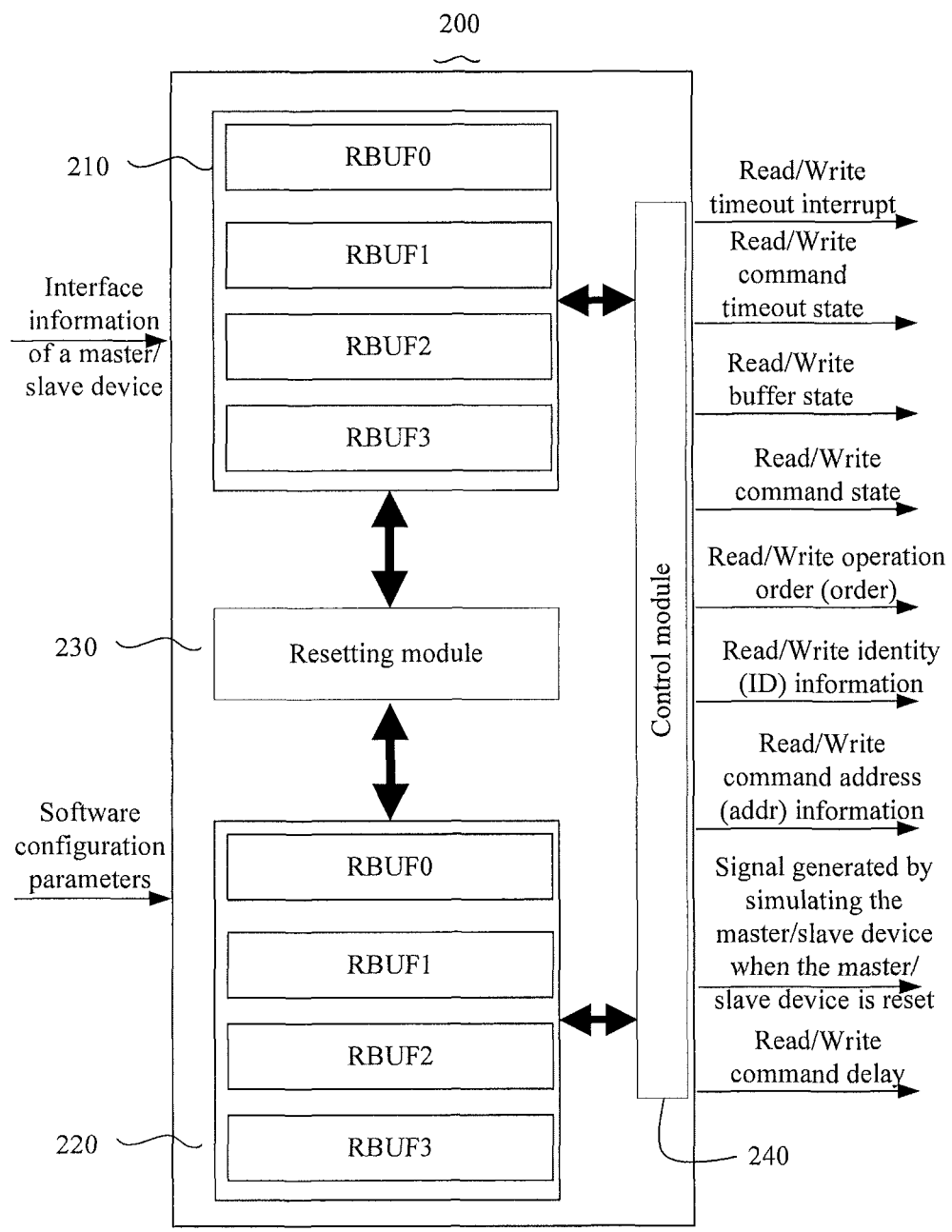
FIG. 6 is a schematic diagram of a monitoring apparatus shown in FIG. 5.

FIG. 6 is a schematic diagram of a monitoring apparatus shown in FIG. 5. Herein, the present invention is described by using an example in which a monitoring apparatus is connected to a port of a bus and a supported maximum number of uncompleted read commands is 4 and a supported maximum number of uncompleted write commands is 4.

As shown in FIG. 6, a monitoring apparatus 200 includes a read buffer module 210, a write buffer module 220, a resetting (RESET) module 230, and a control (CTRL) module 240. The read buffer module 210 includes multiple read buffers (Read Buffer, RBUF) 211, and the write buffer module 220 includes multiple write buffers (Write Buffer, WBUF) 221. To support the read/write commands with the maximum number of uncompleted commands being 4, in this embodiment, the read buffer module 210 includes four read buffers 211, for example, read buffers RBUF0, RBUF1, RBUF2, and RBUF3, which are respectively configured to record state information of read commands assigned to the read buffers 211; and the write buffer module 220 includes four write buffers 221, for example, write buffers WBUF0, WBUF1, WBUF2, and WBUF3, which are respectively configured to record state information of write commands assigned to the write buffers 221. The resetting module 230 is respectively connected to the read buffer module 210 and the write buffer module 220 to reset the read buffers 211 in the read buffer module 210 and/or the write buffers 221 in the write buffer module 220. The control module 240 is respectively connected to the read buffer module 210 and the write buffer module 220 to control the read buffers 211 in the read buffer module 210 and/or the write buffers 221 in the write buffer module 220 to complete, in a virtual manner, read commands or write commands that are uncompleted by the master device 110 or slave device 120.

An input of the monitoring apparatus 200 includes first port information/second port information and software configuration parameters, where the first port information/second port information includes information such as a read/write command, read/write data, a write response, and a read response. An output of the monitoring apparatus 200 is state information of each command stored in each buffer (the read buffers 211 and/or write buffers 221) therein, for example, a read/write timeout interrupt, a read/write command timeout state, a read/write buffer state, a read/write command state, a read/write command order (order), read/write command identity number (ID) information, read/write command address (addr) information, a signal generated by simulating the master/slave device when the master/slave device is reset, and a read/write command delay.

The monitoring apparatus 200 needs to support the high-speed bus, but commands in the number of uncompleted commands of the high-speed bus generally support different identities IDs, that is, commands sent by a source end have corresponding identities IDs, and the commands of different identities IDs may be executed in disorder and responses are returned, but commands of a same identity number must be executed in order and responses are returned. Therefore, the monitoring apparatus 200 needs to support processing of different commands in order and disorder respectively, and needs to solve the problem of how to place a command in which buffer and how to find which command corresponds to a current operation.

In the present invention, when commands are assigned to different buffers, commands of different identity numbers IDs are respectively assigned to different buffers, and when different commands of a same identity number are assigned to different buffers, a corresponding operation order is further assigned in sequence to identify the order of the different commands of the same identity number ID. Both subsequent data and a response operation include an identity number ID in the bus protocol. After detecting an operation of the port of the high-speed bus, the monitoring apparatus 200 finds, according to an identity number ID, all buffers therein complying with the identity number ID, and then finds a buffer with the lowest operation order in the buffers to update state information corresponding to the buffer and determine whether the buffer times out.

Figure 7:
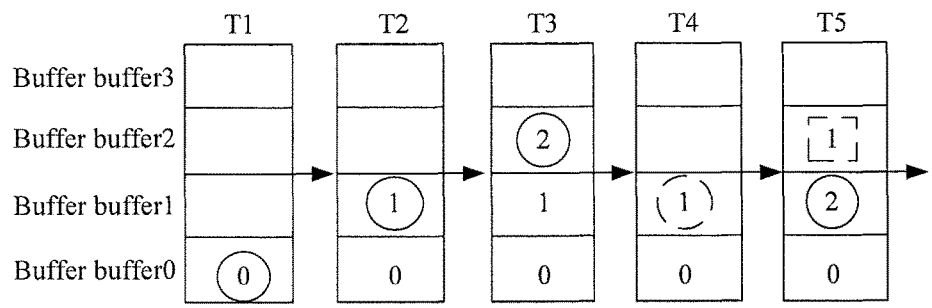
FIG. 7 is a schematic diagram of an operation of assigning different commands of a same identity number ID by the monitoring apparatus shown in FIG. 6 to different buffers.

FIG. 7 is a schematic diagram of an operation of assigning different commands of a same identity number ID by the monitoring apparatus shown in FIG. 6 to different buffers. As shown in FIG. 7, a digit indicates an operation order of each command; a digit in a buffer indicates that a corresponding buffer has stored commands; the solid circle indicates storage of a new command; the dashed circle indicates completion of a command; and the dashed block indicates that an operation order of a command is changed.

As shown in FIG. 7, at time T1, a first command is sent and stored in a buffer buffer0, and its operation order is 0; at time T2, when the first command is uncompleted, a second command is sent and stored in a buffer buffer1, and its operation order is 1; at time T3, when neither the first command nor the second command is completed, a third command is sent and stored in a buffer buffer2, and its operation order is 2; at time T4, when the second command is completed, that is, the command stored in the buffer buffer1 is completed, an operation order of all commands remains unchanged; and at time T5, when a new command arrives, because the second command originally stored in the buffer buffer1 is completed (the operation order of the second command is 1), if an operation order of the commands stored in other buffers is smaller than the operation order (which is 1) of the second command originally stored in the buffer buffer1, for example, the operation order of the first command stored in the buffer buffer0 is 0, the operation order of the commands stored in other buffers remains unchanged; however, if the operation order of the commands stored in other buffers is greater than the operation order (which is 1) of the second command originally stored in the buffer buffer1, for example, the operation order of the third command stored in the buffer buffer0 originally is 2, the operation order of the commands stored in other buffers is reduced by 1, that is, the operation order of the third command stored in the buffer buffer0 changes to 1, while the new command is stored in the buffer buffer1 and its operation order is 2.

The manner of assigning an operation order shown in FIG. 7 is directed to different commands of a same identity number ID, that is, different commands of the same identity number ID are processed in order. Commands of different identities IDs may be respectively assigned to different buffers in disorder.

Figure 8:
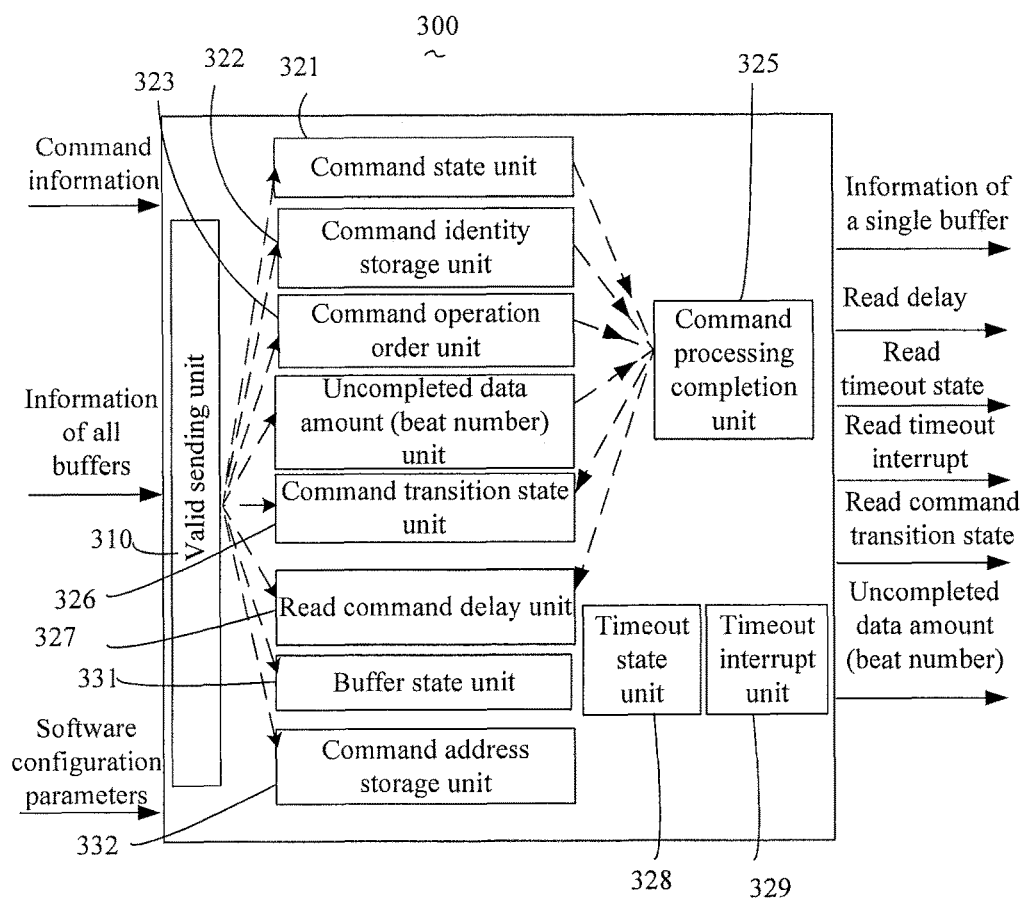
FIG. 8 is a schematic diagram of any buffer in the monitoring apparatus shown in FIG. 6.

FIG. 8 is a schematic diagram of any buffer in the monitoring apparatus shown in FIG. 6. As shown in FIG. 8, the input of a buffer 300 includes command information, information of all buffers, and software configuration parameters; and the output of the buffer includes information of a single buffer, a read delay, a read timeout state, a read timeout interrupt, a read command transition state, an uncompleted data amount, and so on.

As shown in FIG. 8, the buffer 300 includes a command valid sending unit 310, a command state unit 321, a command identity number storage unit 322, a command operation order unit 323, an uncompleted data amount (beat number) unit 324, a command completion unit 325, a command transition state unit 326, a read command delay unit 327, a timeout state unit 328, a timeout interrupt unit 329, a buffer state unit 331, and a command address storage unit 332. The command valid sending unit 310 is configured to record whether a command assigned to the buffer 300 is validly written to the buffer 300; the command state unit 321 is configured to record whether state information of the command assigned to the buffer 300 is occupied or idle; the command identity number storage unit 322 is configured to record an identity number ID of the command assigned to the buffer 300; the command operation order unit 323 is configured to record an operation order of the command assigned to the buffer 300; the uncompleted data amount unit 324 is configured to record an uncompleted data amount (beat number) in data corresponding to the command assigned to the buffer 300; the command completion unit 325 is configured to record whether the command assigned to the buffer 300 is completed within a configured time; the command transition state unit 326 is configured to record a current specific state of the command assigned to the buffer 300; the read command delay unit 327 is configured to obtain a command delay when the command assigned to the buffer 300 is completed within the configured time; the timeout state unit 328 is configured to record a timeout state of the command assigned to the buffer 300; the timeout interrupt unit 329 is configured to report an interrupt when the state of the command transitions to the timeout state; the buffer state unit 331 is configured to record the state of the buffer; and the command address storage unit 332 is configured to record a storage address of the command assigned to the buffer.

As seen from FIG. 8, in the present invention, the buffer 300 may at least record the state of the command assigned to the buffer, an identity number ID, an uncompleted data amount (beat number), and an operation order. The four pieces of information must be recorded by each buffer. Of course, each buffer may be further designed to record other relevant contents such as the storage address of the command assigned to the buffer and the state of the buffer. The maintainability and testability requirements may be selected according to actual requirements.

Figure 9:
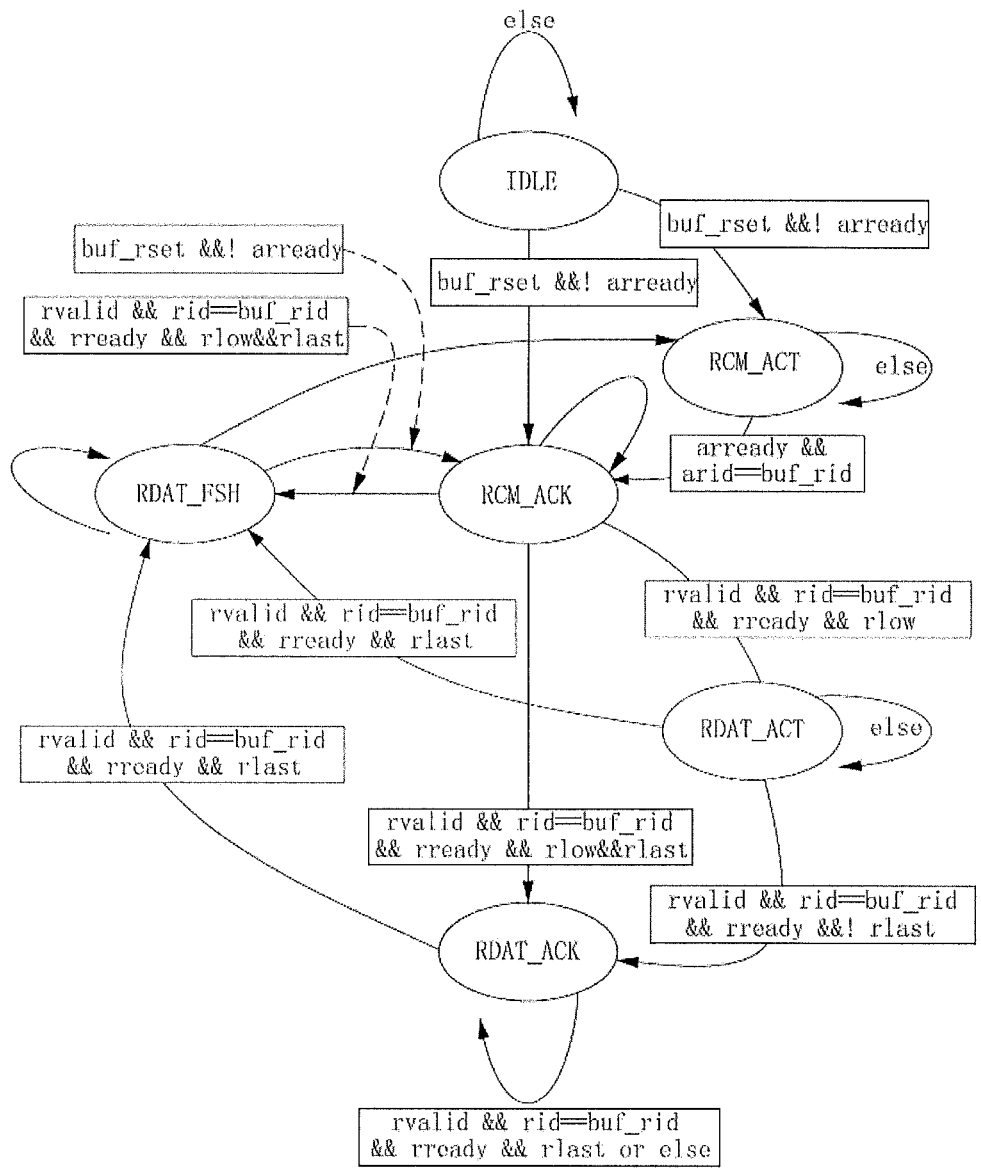
FIG. 9 is a schematic diagram of a command state of a read command that is recorded by a buffer.

In the present invention, buffers may be respectively used to record the states of commands assigned to the buffers (the states are recorded in the command transition state unit 326). Using a read command in the AXI high-speed bus protocol as an example, the state of a command that is recorded by a buffer is shown in FIG. 9, where the meaning of each state shown in FIG. 9 is as follows:

IDLE: idle state, indicating that the buffer does not store a read command;

RCM_ACT: indicating that the read command is sent validly but is not received, that is, arvalid is valid but arready is invalid;

RCM_ACK: indicating that the read command is sent validly and received, that is, both arvalid and arready are valid;

RDAT_ACT: indicating that the read command is a processed command, and that read data is sent validly but is not received, that is, rid is matched, rlow is 1, rvalid is valid, and rready is invalid;

RDAT_ACK: indicating that the read command is a processed command, and that the read data is sent validly and received, that is, rid is matched, rlow is 1, and both rvalid and rready are valid, but the last data is not read, that is, rlast is invalid; and RDAT_FSH: indicating that the read command is a processed command, and that the last data is sent and received, that is, rid is matched, rlow is 1, and rvalid, rready, and rlast are all valid; when the buffer is occupied by the read command again, a direct transition from the state is performed, or otherwise, the state remains unchanged.

Figure 10:
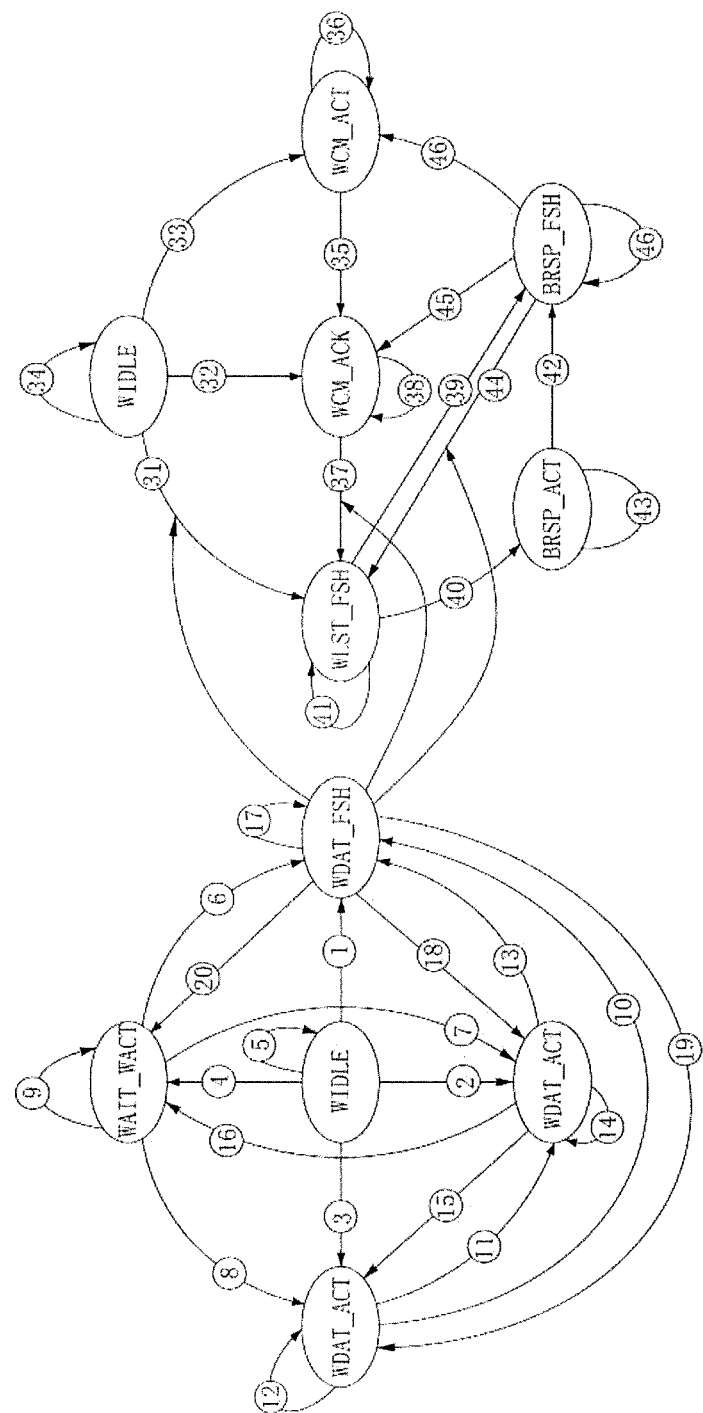
FIG. 10 is a schematic diagram of a command state of a write command that is recorded by a buffer.

Using a write command in the AXI high-speed bus protocol as an example, a command state recorded by a buffer is shown in FIG. 10, where the meaning of each state shown in FIG. 10 is as follows:

WIDLE: idle state, indicating that the buffer does not store a write command;

WAIT_WACT: indicating that the write command is validly sent but data is not sent;

WDAT_ACT: indicating that the write command is processed and write data is validly sent but is not received, that is, id is matched, wlow is 1, wvalid is valid, and wready is invalid;

WDAT_ACK: indicating that the write command is processed and the write data is validly sent and received, that is, id is matched, wlow is 1, both wvalid and wready are valid, and wlast is invalid;

WDAT_FSH: indicating that the write command is processed and the write data is validly sent and received and is the last write data, that is, id is matched, wlow is 1, and wvalid, wready, and wlast are valid;

WCM_ACT: indicating that the command is sent validly but is not received, that is, awvalid is valid but awready is invalid;

WCM_ACK: indicating that the command is sent validly and received, that is, both awvalid and awready are valid;

WLST_FSH: indicating completion of write data;

BRSP_ACT: indicating that the write command is processed and that a write response is validly sent but is not received, that is, bid is matched, blow is 1, bvalid is valid, and bready is invalid; and BRSP_FSH: indicating that the write command is processed and that the write response is sent validly and received, that is, bid is matched, blow is 1, and both bvalid and bready are valid; when the buffer is occupied by the write command again, a direct transition from the state is performed, or otherwise, the state remains unchanged.

By recording each state of the command, the monitoring apparatus may record whether each command can be completed within the configured time. If the state of the command does not transition to a completed state within the configured time, the monitoring apparatus may actively report an interrupt directly. In the present invention, each monitoring apparatus corresponds to a master device or slave device. Therefore, the present invention can quickly locate, according to the position of a monitoring apparatus which actively reports an interrupt, which master device or slave device is faulty.

In addition, the system on chip of the present invention may further use the monitoring apparatus to query the state of each command that passes through the monitoring apparatus. By querying the state of each command, a command that times out is found out and whether the timeout is caused by an initiator or receiver (corresponding to the master device or slave device connected to the port on the high-speed bus) of the command is found out. In addition, a master device causing the timeout of the command may be found out according to an identity number ID of the command, or a slave device causing the timeout of the command is found out according to an address of the command, so that a faulty node on the high-speed bus is conveniently located.

For example, as shown in FIG. 5, when a monitoring apparatus DRT4 corresponding to a second port s0 of the high-speed bus BUS1 detects that a command that passes through the second port s0 times out, the monitoring apparatus DRT4 reports an interrupt. In addition, the system on chip in the present invention may determine, according to the reported interrupt, whether the timeout of the command is caused by the initiator or receiver of the command and by which specific module. For example, from an indication of a buffer in the monitoring apparatus DRT4, it is known that a command CMD3 times out, and that the state of the command CMD3 indicates that the timeout is caused by an initiator of the command (for example, the timeout occurs because a transition state of the command remains to be the WCM_ACK state), while an identity number ID of the command CMD3 in the system corresponds to the first port m1 of the high-speed bus Bus0; in this case, a system abnormality, which is caused by that a write command of the master device connected to the first port m1 of the high-speed bus Bus0 is sent but no write data is sent, may be located. Of course, a person skilled in the art may understand that in FIG. 5, a monitoring apparatus DRT1 connected to the first port m1 of the high-speed bus Bus0 may also actively report an interrupt directly, notifying the master device connected to the first port m1 of the high-speed bus Bus0 of the system on chip that a command has a problem that the write command is sent but no write data is sent. In addition, the monitoring apparatus of the present invention may reset the faulty node of the high-speed bus, so that the system on chip can work normally.

Specifically, when the monitoring apparatus reports an interrupt, the system on chip may notify a corresponding monitoring apparatus that abnormal resetting needs to be performed on a corresponding module (namely, a corresponding master device or slave device), and the monitoring apparatus replaces the corresponding module to continue completing a bus operation, thereby ensuring that completion of relevant operations of other modules on the high-speed bus is not affected. When the corresponding module is a receiver of the command, the corresponding monitoring apparatus replaces the corresponding receiver to send a response, where the sent response carries an error flag, so as to ensure that the system on chip can identify, in the case of ensuring transmission completion, it is a substitute operation of returning a response. When the corresponding module is an initiator of the command, the corresponding monitoring apparatus replaces the corresponding initiator to initiate a substitute write operation, and further completes the corresponding write operation by identifying a signal, but the data is not actually written to the slave device, so as to avoid the case that the monitoring apparatus initiating the substitute write operation becomes a real initiator of the command. After using the monitoring apparatus to complete the substitute operation, the system on chip further performs a reset operation on the corresponding module.

Figure 11:
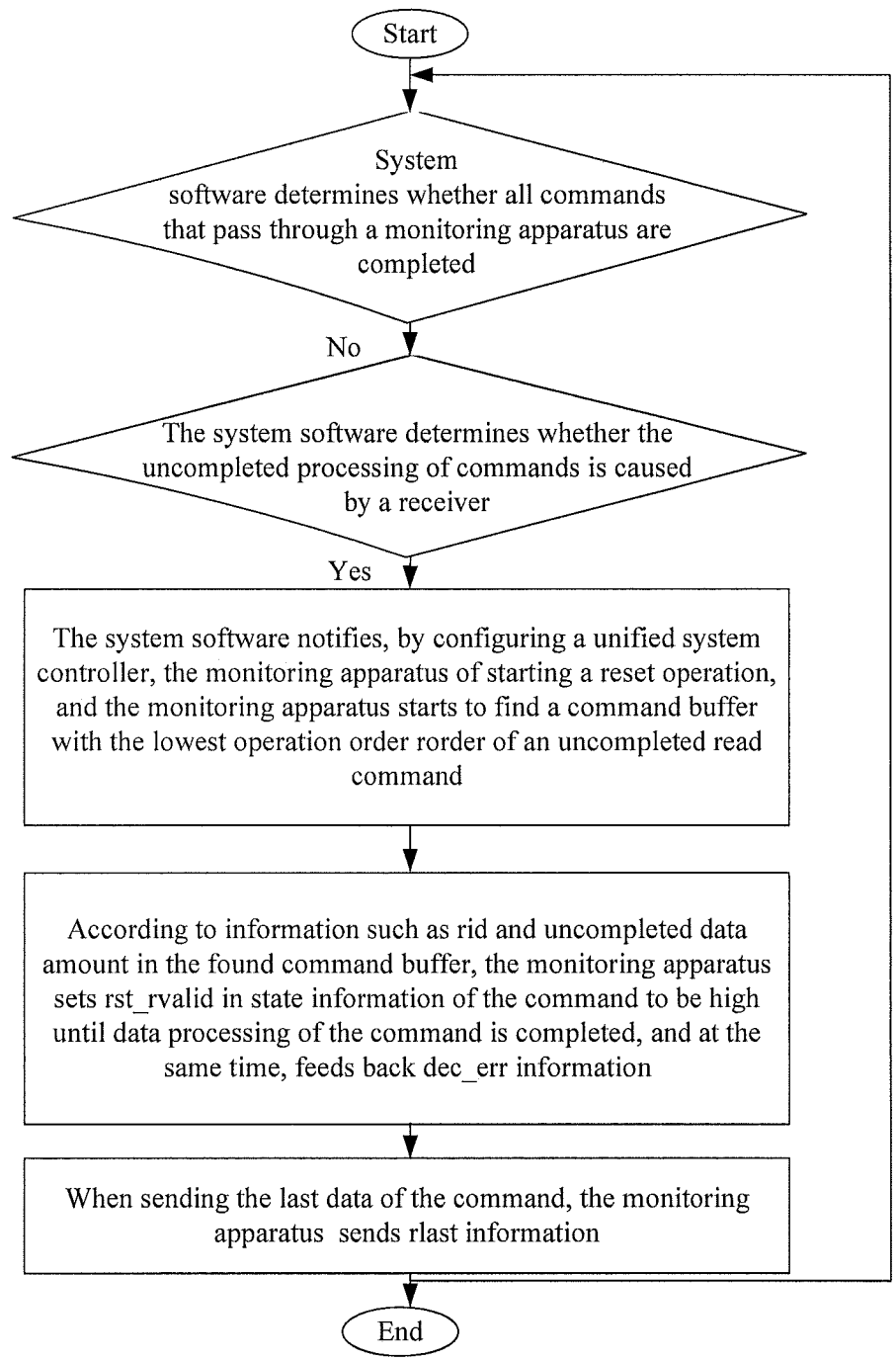
FIG. 11 is a schematic flowchart of a method for abnormal resetting by a monitoring apparatus when a module corresponding to the monitoring apparatus is a receiver of a command.

The following describes the present invention by using a monitoring apparatus supporting the AXI high-speed bus protocol as an example. FIG. 11 is a schematic flowchart of a method for abnormal resetting by a monitoring apparatus when a module corresponding to the monitoring apparatus is a receiver of a command. As shown in FIG. 11, when the module corresponding to the monitoring apparatus is a receiver of a command, the method for abnormal resetting by the monitoring apparatus includes the following:

System software determines whether all commands that pass through the monitoring apparatus are completed; herein, the system software may know, by timeout reporting, whether all the commands that pass through the monitoring apparatus are completed, and if the timeout reporting is uncompleted, it indicates that a command is uncompleted.

Then, when the system software determines to be no, the system software needs to further determine whether the uncompleted processing of command is caused by the receiver; herein, the system software may know, by querying transition states of commands in the buffer in the monitoring apparatus, whether the uncompleted processing of command is caused by the receiver.

When the system software determines that the uncompleted processing of command is caused by the receiver, the system software notifies, by configuring a unified system controller, the monitoring apparatus of starting a reset operation, and the monitoring apparatus starts to find a command buffer with the lowest operation order rorder of an uncompleted read command.

According to information such as rid and uncompleted data amount in the found command buffer, the monitoring apparatus sets rst_rvalid in state information of the command to be high until data processing of the command is completed, and at the same time, feeds back dec_err information.

When the last data of the command is sent, rlast information is sent at the same time.

Then, the monitoring apparatus returns to perform the above determination again until all the commands that pass through the monitoring apparatus are completed.

After completing the above operation, the monitoring apparatus automatically returns a flag to the unified system controller, and then, the unified system controller may reset a slave device corresponding to the monitoring apparatus. Of course, the design may be as follows: When the system software notifies, by configuring the unified system controller, the monitoring apparatus of starting to perform a reset operation, the system software resets the slave device at the same time. In addition, when the reset operation is cancelled for the slave device, the reset operation for the slave device needs to be first cancelled, and then exiting of the reset operation starts to be performed on the monitoring apparatus.

Figure 12:
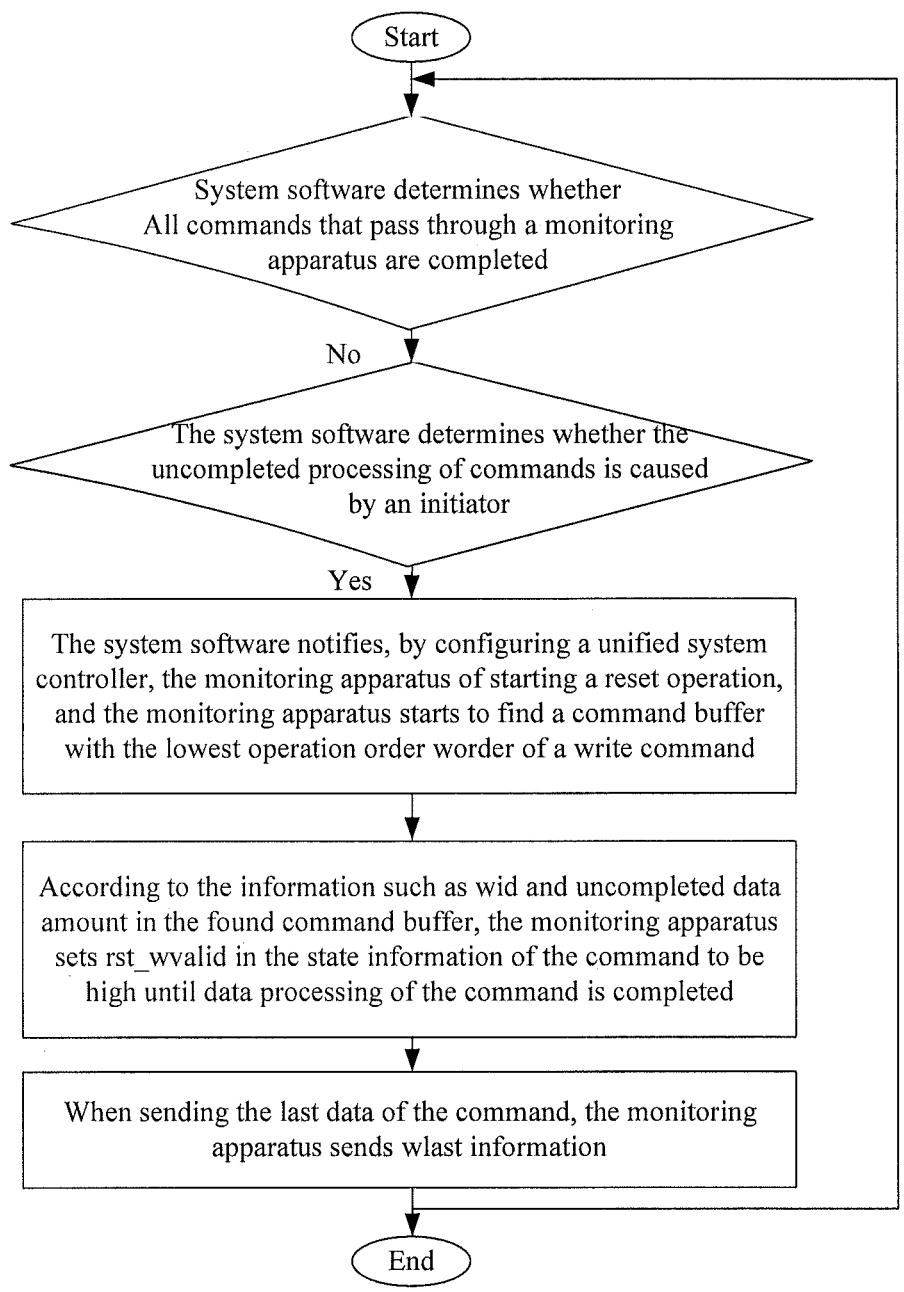
FIG. 12 is a schematic flowchart of a method for abnormal resetting by a monitoring apparatus when a module corresponding to the monitoring apparatus is an initiator of a command.

FIG. 12 is a schematic flowchart of a method for abnormal resetting by a monitoring apparatus when a module corresponding to the monitoring apparatus is an initiator of a command. As shown in FIG. 12, when the module corresponding to the monitoring apparatus is an initiator of a command, the method for abnormal resetting by the monitoring apparatus includes the following:

System software determines whether all commands that pass through the monitoring apparatus are completed; herein, the system software may know, by timeout reporting, whether all the commands that pass through the monitoring apparatus are completed, and if the timeout reporting is uncompleted, it indicates that a command is uncompleted.

Then, when the system software determines to be no, the system software needs to further determine whether the uncompleted processing of command is caused by the initiator; herein, the system software may know, by querying transition states of commands in the buffer in the monitoring apparatus, whether the uncompleted processing of command is caused by the initiator.

When the system software determines that the uncompleted processing of command is caused by the initiator, the system software notifies, by configuring a unified system controller, the monitoring apparatus of starting a reset operation, and the monitoring apparatus starts to find a command buffer with the lowest operation order worder of a write command.

According to information such as wid and uncompleted data amount in the found command buffer, the monitoring apparatus sets rst_wvalid in state information of the command to be high until data processing of the command is completed.

When sending the last data of the command, the monitoring apparatus sends wlast information.

Then, the monitoring apparatus returns to perform the above determination again until all the commands that pass through the monitoring apparatus are completed.

After completing the above operation, the monitoring apparatus automatically returns a flag to the unified system controller, and then, the unified system controller may reset a master device corresponding to the monitoring apparatus. Of course, the design may be as follows: When the system software notifies, by configuring the unified system controller, the monitoring apparatus of starting to perform a reset operation, the system software resets the master device at the same time. In addition, when canceling the reset operation for the master device, the system software needs to first cancel the reset operation for the master device, and then start exiting of the reset operation for the monitoring apparatus.

In the present invention, because the monitoring apparatus supports a function of abnormal resetting, the system on chip may support resetting of a master device or a slave device that is connected to a high-speed bus, which does not cause a deadlock impact on a bus operation; though not all bus operations are completed correctly, operations can be completed by using the monitoring apparatus. After the monitoring apparatus is used to perform a substitute operation on a command that times out, a corresponding master device or slave device may be further reset, so that it can restart to work. Therefore, in the present invention, and especially in a multi-core system, an abnormality of a core does not cause a deadlock of the whole system. After the abnormal core is reset, the software may be reloaded and run, and of course, corresponding software needs to have an error recovery capability to ensure system-level recovery.

Figure 13:
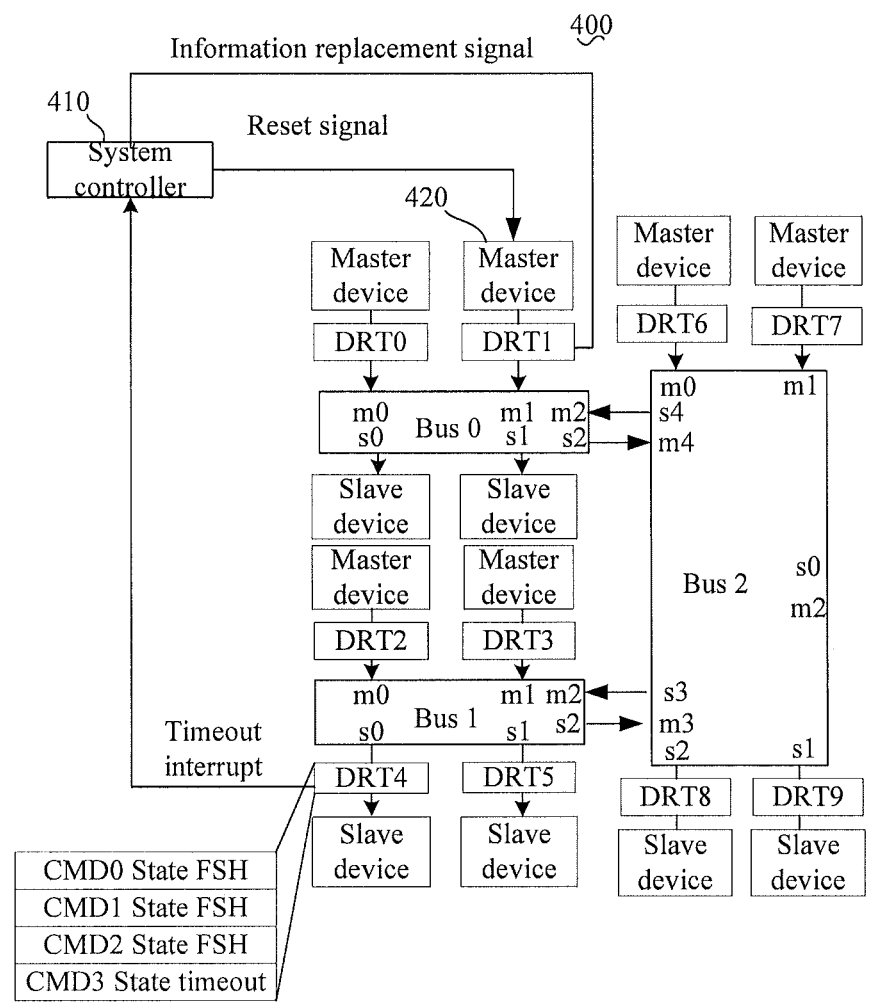
FIG. 13 is a schematic diagram of resetting an abnormal node according to an embodiment of the present invention.

FIG. 13 is a schematic diagram of resetting an abnormal node according to an embodiment of the present invention. As shown in FIG. 13, when a monitoring apparatus DRT4 at a second port s0 of a high-speed bus BUS1 reports a timeout interrupt, a system controller 410 in a system on chip 400 may know, by analyzing state information of a command in the monitoring apparatus DRT4, that the abnormality is caused by a master device 420 at a first port m1 of a high-speed bus BUS0. Therefore, the system controller 410 notifies a monitoring apparatus DRT1 at the first port m1 of the high-speed bus BUS0 of replacing the master device 420, so as to complete an uncompleted write operation, or complete receiving of a read operation and response that are not received completely, and then reset the abnormal master device 420 to restore the abnormality.

As described above, the monitoring apparatus DRT of the present invention may use its internal buffer to store a state of a command, and report an interrupt when the command times out. Because the number of buffers in the monitoring apparatus DRT is generally designed to correspond to the number of uncompleted (outstanding) commands, the monitoring apparatus can only record commands within a number of the uncompleted (outstanding) commands and completed commands, and if the number is exceeded, the completed commands are overwritten. However, though an existing bus trace technology cannot report an error in real time and recover an abnormality, it can record all command operations within a long period, which cannot be completed by the monitoring apparatus DRT. Herein, the monitoring apparatus DRT may be combined with a bus trace apparatus, so that they can not only record all command operations within a long period but also report an error in real time and recover an abnormality.

Figure 14:
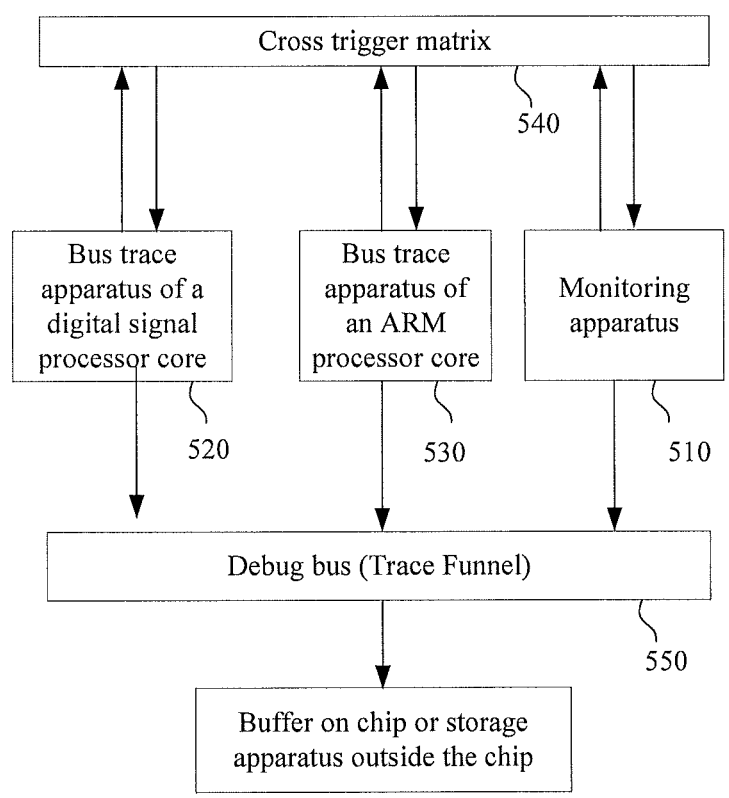
FIG. 14 is a schematic diagram of an application of combining a monitoring apparatus and a bus trace apparatus according to an embodiment of the present invention.

FIG. 14 is a schematic diagram of an application of combining a monitoring apparatus and a bus trace apparatus according to an embodiment of the present invention. As shown in FIG. 14, a first port of a high-speed bus may be further added to a monitoring apparatus 510, and is configured to connect to a debug bus (for example, an ATB debug bus) 550. Therefore, the monitoring apparatus 510 may send, through the debug bus 550, all completed commands recorded by the monitoring apparatus 510 and command that time out to the system. The ATB debug bus 550 may be a Trace Funnel bus.

In addition, a cross trigger port may be further added to the monitoring apparatus 510, and is connected to other bus trace apparatuses, for example, a bus trace apparatus of a digital signal processor core (DSP Core Trace) 520, and a bus trace apparatus of an ARM processor core (ARM Core Trace) 530, through a cross trigger matrix (Cross Trigger Matrix, CTM) 540. The monitoring apparatus 510 and other bus trace apparatuses may mutually trigger, through the cross trigger matrix 540, starting or stopping of recording a command at a corresponding port of the bus and a command state. Then, the ATB debug bus 550, for example, a Trace Funnel bus, connected to the monitoring apparatus 510 and other bus trace apparatuses is used to export a recorded command and command state. In addition, a person skilled in the art may understand that, the cross trigger matrix 540 may be configured to mutually trigger starting and stopping between multiple monitoring apparatuses DRTs.

To conclude, in the system on chip of the present invention, the monitoring apparatus DRT is arranged at the port of the high-speed bus to record the state of the command and report an interrupt when the command times out. Therefore, a faulty node can be quickly located in a complex bus-interconnected system; the cause of the problem is found out: whether the problem is caused by an abnormality of the initiator or receiver of the command; and a phase in which the problem occurs is determined according to the state of the command. In the present invention, an abnormality is reported actively and the abnormal node is reset (namely, an active abnormality processing manner), but in the prior art, an abnormal node is determined by passive parsing and analysis in a later phase. Therefore, the present invention improves the locating efficiency greatly without scenario recurrence and without exporting all data for analysis, thereby reducing the workload significantly.

In addition, in the present invention, the monitoring apparatus may further resets the abnormal node, and can support abnormality recovery of the node in the complex system and play a very important role in a multi-core system, and especially in a system that has a high reliability requirement. The monitoring apparatus may report an interrupt when a command times out, so that the abnormal node is known and reset. After the resetting, software resetting may be canceled, so that the software is reloaded and starts to run, as long as the software architecture in the system correspondingly supports software operations after the recovery, so as to avoid a deadlock of the whole system.

In addition, in the present invention, the monitoring apparatus may be used with the bus trace apparatus, which improves compatibility of the monitoring apparatus, so that the monitoring apparatus can not only record all command operations within a long period but also report an error in real time and recover an abnormality.

The foregoing descriptions are only exemplary embodiments of the present invention, and the present invention is not limited thereto in any form. A person skilled in the art may use the technical disclosure disclosed in the above to make any variations, or modify the equivalent changes in to equivalent embodiments. Any simple variations, equivalent changes, or modifications made to the foregoing embodiments according to the technical essence of the present invention without departing from contents of the technical solutions of the present invention shall all fall within the scope of the technical solutions of the present invention.

What is claimed is:

1. A system on chip, comprising:
a master device;
a slave device;
a high-speed bus; and
a monitoring apparatus, wherein:
the master device interfaces to the high-speed bus through a first port of the high-speed bus, and the slave device interfaces to the high-speed bus through a second port of the high-speed bus, so that the master device is capable of accessing the slave device; and
the monitoring apparatus is arranged between the first port of the high-speed bus and the master device, and/or between the second port of the high-speed bus and the slave device, and configured to record, based on a high-speed bus communication protocol, state information of each command that passes through the first port and/or the second port, and when state information of a command indicates that an operation of the command is in a timeout state, report an interrupt to locate a faulty node on the high-speed bus, the monitoring apparatus comprising:
 a read buffer to record state information of a read command assigned to the read buffer;
 a write buffer to record state information of a write command assigned to the write buffer;
 a controller, respectively in communication with the read buffer and the write buffer to control the read buffer and/or the write buffer to complete, in a virtual manner, a read command and/or a write command that is uncompleted by the master device or slave device; and
 a reset, respectively in communication with the read buffer and the write buffer to reset the read buffer and/or the write buffer; and
 the read buffer and/or the write buffer respectively records the state, an identity number, an uncompleted data amount, and an operation order of a command assigned to the buffer.

2. The system on chip according to claim 1, wherein after the monitoring apparatus reports an interrupt to locate a faulty node on the high-speed bus, the monitoring apparatus at the node replaces the corresponding master device or slave device to complete, in a virtual manner, the command in the timeout state, and performs a reset operation on the corresponding master device or slave device.

3. The system on chip according to claim 1, wherein: the monitoring apparatus is further connected to a debug bus and configured to export the state information of each command that is recorded by the monitoring apparatus, so that the state information of each command that is recorded by the monitoring apparatus is stored.

4. The system on chip according to claim 1, wherein: at the port of the high-speed bus, a bus trace apparatus is further arranged to record each command that passes through the port, wherein the bus trace apparatus works with the monitoring apparatus to record each command that passes through the port and state information of each command.

5. A system on chip, comprising a master device, a slave device, a high-speed bus, and a monitoring apparatus, wherein:
the master device is connected to a first port of the high-speed bus, and the slave device is connected to a second port of the high-speed bus, so that the master device is capable of accessing the slave device;
the monitoring apparatus is arranged between the first port of the high-speed bus and the master device, and/or between the second port of the high-speed bus and the slave device, and configured to record, based on a high-speed bus communication protocol, state information of each command that passes through the first port and/or the second port, and when state information of a command indicates that an operation of the command is in a timeout state, report an interrupt to locate a faulty node on the high-speed bus;
after the monitoring apparatus reports an interrupt to locate a faulty node on the high-speed bus, the monitoring apparatus at the node replaces the corresponding master device or slave device to complete, in a virtual manner, the command in the timeout state, and performs a reset operation on the corresponding master device or slave device;
the monitoring apparatus comprises:
a read buffer module, comprising at least one read buffer configured to record state information of a read command assigned to the read buffer;
a write buffer module, comprising at least one write buffer configured to record state information of a write command assigned to the write buffer;
a control module, respectively connected to the read buffer module and the write buffer module to control the read buffer in the read buffer module and/or the write buffer in the write buffer module to complete, in a virtual manner, a read command and/or a write command that is uncompleted by the master device or slave device; and
a resetting module, respectively connected to the read buffer module and the write buffer module to reset the read buffer in the read buffer module and/or the write buffer in the write buffer module; and
each buffer in the read buffer in the read buffer module and/or the write buffer in the write buffer module respectively records the state, an identity number, an uncompleted data amount, and an operation order of a command assigned to the buffer.

6. The system on chip according to claim 5, wherein the number of the read buffers in the read buffer module and the number of the write buffers in the write buffer module are respectively equal to a maximum number of uncompleted commands that is supported by the first port and a maximum number of uncompleted commands that is supported by the second port, and the maximum number of uncompleted commands that is supported by the first port is equal to the maximum number of uncompleted commands that is supported by the second port.

7. The system on chip according to claim 6, wherein an input of the monitoring apparatus comprises first port information/second port information, and an output of the monitoring apparatus comprises state information of each command assigned to each buffer therein and the reported interrupt.

8. The system on chip according to claim 7, wherein the first port information/second port information comprises a read/write command, read/write data, a write response, or a read response.

9. The system on chip according to claim 7, wherein the state information of each command assigned to each buffer comprises a read/write timeout interrupt, a read/write command timeout state, a read/write buffer state, a read/write command state, a read/write command order, read/write command identity number information, read/write command address information, a signal generated by simulating the master/slave device when the master/slave device is reset, and a read/write command delay.

10. The system on chip according to claim 7, wherein the monitoring apparatus assigns each command to each buffer therein, so that each buffer respectively records state information of the assigned command, wherein commands of different identities are respectively assigned to different buffers, and when different commands of a same identity number are assigned to different buffers, a corresponding operation order is further assigned in sequence to identify the order of the different commands of the same identity.

11. The system on chip according to claim 7, wherein the buffer comprises:
a command valid sending unit, configured to record whether a command assigned to the buffer is validly written to the buffer;
a command state unit, configured to record whether state information of the command assigned to the buffer is occupied or idle;
a command identity number storage unit, configured to record an identity number of the command assigned to the buffer;
a command operation order unit, configured to record an operation order of the command assigned to the buffer;
an uncompleted data amount unit, configured to record an uncompleted data amount in data corresponding to the command assigned to the buffer;
a command completion unit, configured to record whether the command assigned to the buffer is completed within a configured time;
a command transition state unit, configured to record a current specific state of the command assigned to the buffer;
a read command delay unit, configured to obtain a command delay when the command assigned to the buffer is completed within the configured time;
a timeout state unit, configured to record a timeout state of the command assigned to the buffer;

a timeout interrupt unit, configured to report an interrupt when the state of the command transitions to the timeout state;

a buffer state unit, configured to record the state of the buffer; and a command address storage unit, configured to record a storage address of the command assigned to the buffer.

12. The system on chip according to claim 11, wherein when the command assigned to the buffer is a read command, the state of the read command that is recorded by the buffer comprises IDLE, RCM_ACT, RCM_ACK, RDAT_ACT, RDAT_ACK, and RDAT_FSH.

13. The system on chip according to claim 11, wherein when the command assigned to the buffer is a write command, the state of the write command that is recorded by the buffer comprises WIDLE, WAIT_WACT, WDAT_ACT, WDAT_ACK, WDAT_FSH, WCM_ACT, WCM_ACK, WLST_FSH, BRSP_ACT, and BRSP_FSH.

14. A monitoring method applied in a system on chip, wherein: the system on chip comprises a master device, a slave device, a high-speed bus, and a monitoring apparatus, wherein the master device interfaces to the high-speed bus through a first port of the high-speed bus, and the slave device interfaces to the high-speed bus through a second port of the high-speed bus, so that the master device is capable of accessing the slave device; and the monitoring apparatus is arranged between the first port of the high-speed bus and the master device, and/or between the second port of the high-speed bus and the slave device; and wherein the monitoring method comprises:

recording, by the monitoring apparatus, based on a high-speed bus communication protocol, state information of each command that passes through the first port and/or the second port, the recording comprising:
recording, in a read buffer, state information of a read command assigned to the read buffer, and
recording, in a write buffer, state information of a write command assigned to the write buffer;

when state information of a command indicates that an operation of the command is in a timeout state, reporting, by the monitoring apparatus, an interrupt to locate a faulty node on the high-speed bus;

controlling, by the monitoring device, the read buffer and/or the write buffer to complete, in a virtual manner, a read command and/or a write command that is uncompleted by the master device or slave device;

resetting, by the monitoring device, the read buffer and/or the write buffer; and recording, by the monitoring device, in the read buffer and/or the write buffer respectively the state, an identity number, an uncompleted data amount, and an operation order of a command assigned to the buffer.

15. The monitoring method according to claim 14, wherein after the monitoring apparatus reports an interrupt to locate a faulty node on the high-speed bus, the monitoring apparatus at the node replaces the corresponding master device or slave device to complete, in a virtual manner, the command in the timeout state, and performs a reset operation on the corresponding master device or slave device.

* * * * *